(12) United States Patent
Heath et al.

(10) Patent No.: US 8,557,199 B2
(45) Date of Patent: Oct. 15, 2013

(54) SELF-POWERED MICROFLUIDIC DEVICES, METHODS AND SYSTEMS

(75) Inventors: James Heath, South Pasadena, CA (US); Lidong Qin, Oasadena, CA (US)

(73) Assignee: California Institute of Technology, Pasadena, CA (US)

( * ) Notice: Subject to any disclaimer, the term of this patent is extended or adjusted under 35 U.S.C. 154(b) by 513 days.

(21) Appl. No.: 12/629,749

(22) Filed: Dec. 2, 2009

(65) Prior Publication Data
US 2010/0140171 A1 Jun. 10, 2010

Related U.S. Application Data

(60) Provisional application No. 61/200,674, filed on Dec. 2, 2008.

(51) Int. Cl.
*B01J 19/00* (2006.01)
*C12M 1/00* (2006.01)
*C12M 1/34* (2006.01)

(52) U.S. Cl.
USPC ........... 422/504; 422/129; 422/211; 422/242; 422/502; 422/503; 422/505; 435/287.1; 435/289.1

(58) Field of Classification Search
USPC .................. 210/637, 137; 422/129, 211, 242; 435/287.1, 289.1; 60/327
See application file for complete search history.

(56) References Cited

U.S. PATENT DOCUMENTS

| | | | |
|---|---|---|---|
| 2005/0287020 A1* | 12/2005 | Lee et al. ................... | 417/413.2 |
| 2008/0060700 A1* | 3/2008 | Gharib et al. .................. | 137/14 |
| 2009/0036324 A1 | 2/2009 | Fan et al. | |
| 2009/0053732 A1 | 2/2009 | Vermesh et al. | |

FOREIGN PATENT DOCUMENTS

| WO | 2004/048254 A1 | 6/2004 |
|---|---|---|
| WO | 2008/030541 A1 | 3/2008 |

OTHER PUBLICATIONS

Anderson, N. L., et al., "The Human Plasma Proteome. History, Character, and Diagnostic Prospects," Mol. Cell. Proteomics 1:845-867 (2002).
Bailey, R. C., et al., "DNA-Encoded Antibody Libraries: A Unified Platform for Multiplexed Cell Sorting and Detection of Genes and Proteins," J. Am. Chem. Soc. 129:1959-1967 (2007).
Beebe, D. J., et al., "Physics and Applications of Microfluidics in Biology," Annu. Rev. Biomed. Eng. 4:261-286 (2002).
Cho, J.H., et al., "Plastic ELISA-On-A-Chip Based on Sequential Cross-Flow Chromatography," Anal. Chem. 78:793-800 (2006).
Choi, Y. H., et al., "A Micropump Operating with Chemically Produced Oxygen Gas," Sensors & Actuators A 111:8-13 (2004).
Dittrich, P. S., et al., "Micro Total Analysis Systems. Latest Advancements and Trends," Anal. Chem. 78:3887-3908 (2006).
Engvall, E., et al., "Enzyme-Linked Immunosorbent Assay (ELISA) Quantitative Assay of Immunoglobulin G," Immunochem. 8:871-874 (1971).
Fan, R., et al., "Integrated Blood Barcode Chips," Nat. Biotechnol. 26(12):1373-1378 (2008).
Fung, Y.C., "Stochastic Flow in Capillary Blood Vessels," Microvascular Research 5:34-48 (1973).

(Continued)

*Primary Examiner* — John Kim
(74) *Attorney, Agent, or Firm* — Lathrop & Gage LLP; Sean M. Coughlin, Esq.

(57) ABSTRACT

A power source for actuation of a microfluidic device and related devices, methods and systems.

12 Claims, 11 Drawing Sheets

(56) References Cited

OTHER PUBLICATIONS

Gao, J., et al., "Integrated Microfluidic System Enabling Protein Digestion, Peptide Separation, and Protein Identification," Anal. Chem. 73:2648-2655 (2001).
Giguere, P. A., et al., "Hydrogen Peroxide and Its Analogues," Can. J. Chem. 33:804-820 (1955).
Good, B. T., et al., "An Effervescent Reaction Micropump for Portable Microfluidic Systems," Lab Chip 6:659-666 (2006).
Henares, T. G., et al., "Current Development in Microfluidic Immunosensing Chip," Analytica Chimica Acta 611:17-30 (2008).
Hofmann, O., et al., "Three-Dimensional Microfluidic Confinement for Efficient Sample Delivery to biosensor Surfaces. Application to Immunoassays on Planar Optical Waveguides," Anal. Chem. 74:5243-5250 (2002).
Karcher, J., et al., "Cytokine Expression of Transforming Growth Factor-Beta2 and Interleukin-10 in Squamous Cell Carcinomas of the Head and Neck. Comparison of Tissue Expression and Serum Levels," HNO 47:879-884 (1999).
Kupczyk, M., et al., "Serum Interkeukin 10, 12, 18 and Interferon Alpha (IFN Alpha) Levels in Patients Suffering from Allergic Rhinitis After Specific Immunotherapy," Allergy 62:248-eoa (2007).
Lin, W.W., et al., "A Cytokine-Mediated Link Between Innate Immunity, Inflammation, and Cancer," J. Clin. Invest. 117 (5):1175-1183 (2007).
Liotta, L. A., et al., "Written in Blood," Nature 425:905 (2003).
Munyan, J. W., et al., "Electrically Actuated, Pressure-Driven Microfluidic Pumps" Lab Chip 3:217-220 (2003).
Navarrete, M., et al., "Serum Levels of Soluble Interleukin 10 (IL-10) in Patients with Hodgkin's Lymphoma: Predictive Value in Advanced Stage," Blood 108:227B (2006).
Romani, L., et al., "Interleukin-12 in Infectious Diseases," Clin. Microbiol. Rev. 10(4):611-636 (1997).
Schweitzer, B., et al., "Multiplexed Protein Profiling on Microarrays by Rolling-Circle Amplification," Nat. Biotechnol. 20(4):359-365 (2002).
Svanes, K., et al., "Variations in Small Blood Vessel Hematocrits Produced in Hypothermic Rats by Micro-Occlusion," Microvascular Research 1:210-220 (1968).
Thorsen, T., et al., "Microfluidic Large-Scale Integration," Science 298:580-584 (2002).
Yang, S., et al., "A Microfluidic Device for Continuous, Real Time Blood Plasma Separation," Lab Chip 6:871-880 (2006).
Zimmermann, M., et al., "Modeling and Optimization of High-Sensitivity, Low-Volume Microfluidic-Based Surface Immunoassays," Biomed. Microdevices 7(2):99-110 (2005).
European Office Action from EP Application No: 09768570.5, dated May 18, 2012.
Shu-Sung Lin et al: "Catalytic Decomposition of Hydrogen Peroxide on Iron Oxide: Kinetics, Mechanism, and Implications", Environmental Science & Technology, vol. 32, No. 10, May 1, 1998, pp. 1417-1423.

\* cited by examiner

```
SEQUENCE LISTING

<160> NUMBER OF SEQ ID NOS: 25

<210> SEQ ID NO 1
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 1
aaaaaaaaaa gagtagcctt cccgagcatt                                          30

<210> SEQ ID NO 2
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 2
aaaaaaaaaa aatgctcggg aaggctactc                                          30

<210> SEQ ID NO 3
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 3
aaaaaaaaaa tatgggtctt gctgatacgc                                          30

<210> SEQ ID NO 4
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 4
aaaaaaaaaa gcgtatcagc aagaccata                                           30

<210> SEQ ID NO 5
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 5
aaaaaaaaaa gcgtgtgtgg actctctcta                                          30

<210> SEQ ID NO 6
<211> LENGTH: 30
<212> TYPE: DNA
<213> ORGANISM: Artificial Sequence
```

```
<220> FEATURE:
<223> OTHER INFORMATION: Synthetic Polynucleotide

<400> SEQUENCE: 6
aaaaaaaaaa tagagagagt ccacacacgc                                30

<210> SEQ ID NO 7
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 7
aaaaaaaaaa tcgccgttgg tctgtatgca                                30

<210> SEQ ID NO 8
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 8
aaaaaaaaaa tgcatacaga ccaacggcga                                30

<210> SEQ ID NO 9
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 9
aaaaaaaaaa ggcggctatt gacgaactct                                30

<210> SEQ ID NO 10
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 10
aaaaaaaaaa agagttcgtc aatagccgcc                                30

<210> SEQ ID NO 11
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 11
aaaaaaaaaa aatgagcgcg aacacctgac                                30

<210> SEQ ID NO 12
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 12
aaaaaaaaaa aatgagcgcg aacacctgac                                30
```

```
<210> SEQ ID NO 13
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 13
aaaaaaaaaa tcttctagtt gtcgagcagg                                  30

<210> SEQ ID NO 14
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 14
aaaaaaaaaa cctgctcgac aactagaaga                                  30

<210> SEQ ID NO 15
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 15
aaaaaaaaaa gcgtgtgtgg actctctcta                                  30

<210> SEQ ID NO 16
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 16
aaaaaaaaaa tagagagagt ccacacacgc                                  30

<210> SEQ ID NO 17
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 17
aaaaaaaaaa ctctgtgaac tgtcatcggt                                  30

<210> SEQ ID NO 18
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 18
aaaaaaaaaa accgatgaca gttcacagag                                  30

<210> SEQ ID NO 19
<211> LENGTH: 30
<212> TYPE: DNA
<213> ORGANISM: Artificial Sequence
<220> FEATURE:
<223> OTHER INFORMATION: Synthetic Polynucleotide
```

-continued

```
<400> SEQUENCE: 19
aaaaaaaaaa gtcctcgctt cgtctatgag                                              30

<210> SEQ ID NO 20
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 20
aaaaaaaaaa ctcatagacg aagcgaggac                                              30

<210> SEQ ID NO 21
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 21
aaaaaaaaaa gtcgaggatt ctgaacctgt                                              30

<210> SEQ ID NO 22
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 22
aaaaaaaaaa taatctaatt ctggtcgcgg                                              30

<210> SEQ ID NO 23
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 23
aaaaaaaaaa ccgcgaccag aattagatta                                              30

<210> SEQ ID NO 24
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 24
aaaaaaaaaa tgccctattg ttgcgtcgga                                              30

<210> SEQ ID NO 25
<211> LENGTH: 30
<212> TYPE: DNA
<213> ORGANISM: Artificial Sequence
<220> FEATURE:
<223> OTHER INFORMATION: Synthetic Polynucleotide

<400> SEQUENCE: 25
aaaaaaaaaa tccgacgcaa caatagggca                                              30
```

SELF-POWERED MICROFLUIDIC DEVICES, METHODS AND SYSTEMS

CROSS REFERENCE TO RELATED APPLICATIONS

This application claims priority to U.S. provisional application U.S. Ser. No. 61/200,674 entitled "Self-Powered, Microfluidics Chip for Multiplexed Protein Assays from Whole Blood" filed on Dec. 2, 2008 incorporated herein by reference in its entirety.

STATEMENT OF GOVERNMENT GRANT

The U.S. Government has certain rights in this invention pursuant to Grant No. DAAD19-03-D-0004 awarded by ARO Grant No. CA119347 awarded by the National Institute of Health.

TECHNICAL FIELD

The present disclosure relates to a power source and related devices methods and systems suitable for the operation of microfluidic devices.

BACKGROUND

Microfluidic devices provide a method for performance of various chemical and biological assays which use relatively small volumes of fluids. The integration of assays into microfluidic systems permits the evaluation of targets of choice (e.g. diagnostic markers) from small quantities of samples because such systems allow for more easily measured reactions.

Most microfluidic-based assays, however, involve significant external accessories, such as pumps, power sources and supplies and fluid handling systems. (P. S. Dittrich, K. Tachikawa and A. Manz, *Analytical Chemistry*, 2006, 78, 3887-3907. T. Thorsen, S. J. Maerkl and S. R. Quake, *Science* (Washington, D.C., United States), 2002, 298, 580-584. J. Gao, J. Xu, L. E. Locascio and C. S. Lee, *Anal. Chem.*, 2001, 73, 2648-2655.)

These accessories, in turn, add complexity to the use of the microfluidic device and limit the portability and flexibility of such devices. Power sources that are efficient, portable and self-contained within the microfluidic device would enhance the efficiency of microfluidic devices. Various embodiments of the present disclosure meet one or more of these and other needs

SUMMARY

Provided herein, are power sources, devices, methods and systems that in several embodiments can be operated in connection with a self-powered microfluidic device.

According to a first aspect, a power source for a microfluidic device is described. The power source comprises: a buffer chamber, a first fluid chamber located in the microfluidic device, with a fluid passage to a second fluid chamber located in the microfluidic device. In the power source, a pin is in contact with the first fluid chamber and is adapted to chemically generate a reaction product from a first fluid in the first fluid chamber to actuate a second fluid in the second fluid chamber.

According to a second aspect, a pumping system to chemically generate pressure for a microfluidic device is described. The pumping system comprises: a reservoir chamber, a pin, a buffer chamber, and a sample loading chamber. In the pumping system, the reservoir chamber is located in the microfluidic device and contains a reservoir fluid. In the pumping system, the pin is located in the microfluidic device and is adapted to actuate the reservoir fluid to chemically generate an expandable reaction product in the reservoir chamber. In the pumping system, the buffer chamber is located in the microfluidic device and is fluidically connected with the reservoir chamber to allow passage of the reservoir fluid from the reservoir chamber to the buffer chamber and vice versa and to hinder passage of the expandable reaction product from the reservoir chamber to the buffer chamber. In the pumping system, the sample loading chamber is located in the microfluidic device and is fluidically connected with the reservoir chamber to allow passage of the expandable reaction product from the reservoir chamber to the sample loading chamber and to hinder passage of the sample from the sample loading chamber to the reservoir chamber.

According to a third aspect, a pressure generation method for a microfluidic device is described. The pressure generation method comprises: providing a liquid in a first microfluidic chamber; performing a catalyzed decomposition of the liquid to generate pressure through the decomposition; and providing a second microfluidic chamber connected with the first microfluidic chamber. In particular the second microfluidic chamber is provided to allow movement of the liquid from the first microfluidic chamber to the second microfluidic chamber as a consequence of the generated pressure and to allow movement of the liquid back from the second microfluidic chamber to the first microfluidic chamber when the generated pressure decreases. In the method, the catalyzed decomposition depends on a level of the liquid inside the first microfluidic chamber, whereby a decreased level of the liquid due to the movement of the liquid from the first microfluidic chamber to the second microfluidic chamber prevents the catalyzed decomposition and an increased level of the liquid inside the first microfluidic chamber due to movement of the liquid from the second microfluidic chamber to the first microfluidic chamber promotes the catalyzed decomposition.

According to a fourth aspect a self-powered microfluidic device is described. The self-powered microfluidic device comprises: an arrangement of microfluidic channels wherein one or more reagents are adapted to flow; a pressure source to pump the reagents through the microfluidic channels and a reagent chamber containing the one or more reagents. In the self-powered microfluidic device, the pressure source comprises: a reservoir containing a substance adapted to generate a pressure-generating reaction product; a trigger, associated with the reservoir, adapted to react with the substance to produce the pressure-generating reaction product; and a buffer chamber in fluid communication with the reservoir, adapted to host the substance upon production of the pressure-generating reaction product. In the self-powered microfluidic device, the reagent chamber is connected between the pressure source and the arrangement of microfluidic channels.

The power sources, devices, methods and systems herein described allow in several embodiments operation of a microfluidic device, without the need of equipments external to the microfluidic device. In particular, in several embodiments, the power source, arrangements, methods and devices herein described allow operation of a microfluidic device without electrical power supply.

Accordingly, the power sources, devices, methods and systems herein described allow in several embodiments operation of a microfluidic device in remote locations and/or in locations where connection of the microfluidic device with off-chip equipment is not feasible or simply not desired.

Additionally, the power sources, devices, methods and systems herein described allow in several embodiments to simplify the structure and operative steps for the device thus allowing use of the microfluidic device by minimally trained individuals Furthermore, the power sources, devices, methods and systems herein described allow in several embodiments to provide power to microfluidic devices in a controllable fashion in term of the amount and/or continuity of the power provided to the microfluidic device.

Also, the power sources, devices, methods and systems herein described allow in several embodiments, a chemically powered completely self-contained chip, wherein the chemical reaction itself can be controlled to allow for broad control over the flow rate.

The power sources, devices, methods and systems herein described can be used in connection with any applications wherein operation of a microfluidic device is desired, including for example performance of various kind of assays in a microfluidic environment, including high throughput, multiplexed assays, directed for example to target detection. As a consequence, exemplary fields where the power source, arrangements, methods and devices herein described can be used include medical, diagnostics, biological research, and veterinary.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings, which are incorporated into and constitute a part of this specification, illustrate one or more embodiments of the present disclosure and, together with the detailed description and examples sections, serve to explain the principles and implementations of the disclosure.

FIG. 5A shows barcode images for four different spiked concentrations of IL-12. IL-10 (indicated with light grey arrows) is detected in the blood. FIG. 5B shows quantitation of fluorescence intensity vs. concentration below 10 picomolar concentration region.

FIG. 6A shows an overview scanning fluorescent image of non-spiked blood (upper) and spiked blood (bottom). FIG. 6B is a an enlarged view of the scanning fluorescent images of box (400) of FIG. 6A for non-spiked blood and FIG. 6C shows an enlarged view of the scanning fluorescent image of box (500) of for spiked blood. FIG. 6D shows a line-signal profile of non-spiked blood (amplified three times) and FIG. 6E shows a line-signal profile of spiked blood (amplified three times).

FIG. 7A shows a schematic representation of a channel design comprising a plurality of channels, each channel configured to allow a speed of plasma different from the other. FIG. 7B shows a scanning fluorescent image of a two minute blood assay performed using a self powered microfluidic device. FIG. 7C shows a scanning fluorescent image of a five minute assay performed with a self-powered microfluidic device. FIG. 7D and FIG. 7E shows line profiles of images of FIG. 7B and FIG. 7C in the squared regions (600) and (700) respectively and in vertical direction.

DETAILED DESCRIPTION

Provided herein are a power source and related microfluidic devices, combinations, methods and systems. In particular, the power source herein described is an on-chip power source, which is designed to be contained and applied towards driving the microfluidic device.

In some embodiments, the power source herein described is based upon a chemical reaction producing an expansible reaction product to actuate the microfluidic device. In particular, an expansible reaction product in the sense of the present disclosure is a reaction product that is capable of increasing in volume and of exerting a pressure on one or more surfaces of a power source wherein the reaction product is produced. Exemplary expansible reaction products comprise gases and other expansible fluids. The power source typically comprises a system of chambers configured to allow the chemical reaction to be triggered in a controllable manner and to direct the reaction product to the microfluidic device also in a controllable manner.

In several embodiments, the power source comprises a reservoir chamber configured to contain at least one fluid reagent of the chemical reaction, a buffer chamber fluidically connected to the reservoir chamber to allow passage of the reagent from the reservoir chamber to the buffer chamber upon production of the reaction product and from the buffer chamber to the reservoir chamber upon decrease in production of the reaction product, and a sample loading chamber configured to contain a fluidic sample and receive the reaction product from the reservoir chamber.

In some embodiments, the chemical reaction is catalytically triggered by activating a button on the chip. In particular, the activation allows contact of a reagent or a catalyst to at least one reagent in the reservoir chamber causing production of the reaction product that is conveyed to the sample loading chamber.

In one embodiment, the reaction product is $O_2$ which is produced by an $O_2$ donor, (e.g. aqueous hydrogen peroxide)

following activation with a catalyst such as Pt or Ag according to the equation:

$$2H2O2_{(l)} \xrightarrow{\text{Catalyst}} 2H2O_{(l)} + O2_{(g)}$$

Figure 1A:
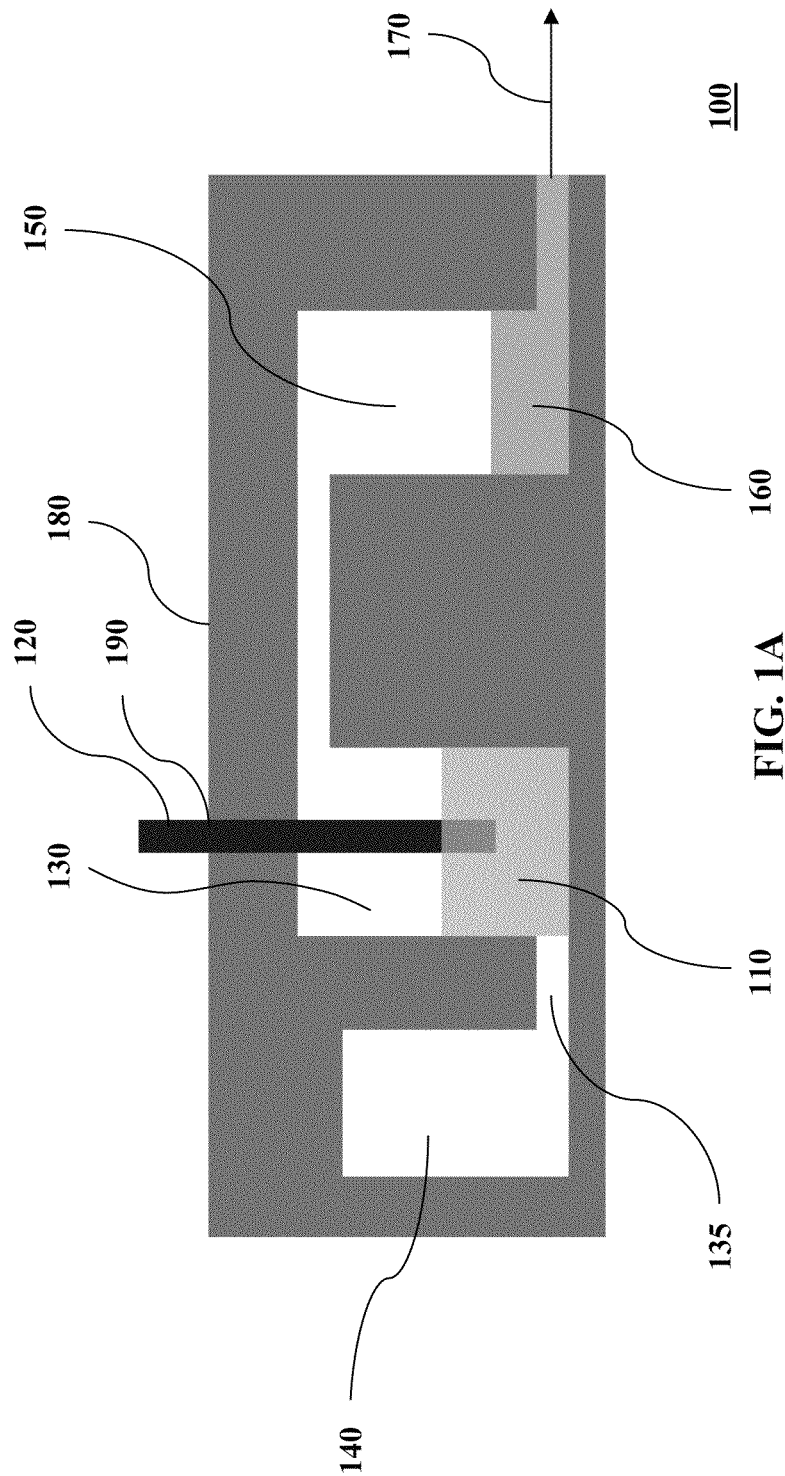
FIG. 1A and FIG. 1B show a schematic cross-sectional view of a power source.

FIG. 1A shows a cross sectional view of a power source (100). In particular, an $H_2O_2$ (peroxide) reservoir (110) was adapted to be actuated by a pin (120). In one embodiment of the disclosure, the pin (120) is a Pt/Ag pin. Reservoir (110) is located in a reservoir chamber (130) that is fluidically connected to an empty buffer chamber (140) through channel (135) and a sample loading chamber (150) where the sample (160), is located. In one embodiment, the sample is whole blood, is located in fluidic communication (170) with a downstream microfluidic circuit (not shown in the figure). Also shown in the figure is a lid (180), e.g. a Polydimethylsiloxane (PDMS) lid, through which a pinhole (190) was microfabricated, to allow passage of the pin (120). The sample (160) is contemplated to comprise any sample, including but not limited to fluids from a biological environment, specimen, cultures, tissues, commercial recombinant proteins, synthetic compounds or portions thereof. Additionally exemplary samples include bodily fluids such as sputum, CSF, sweat, urine, semen, biopsy specimens, pap smear samples or any other sample obtained from a human or a an animal being that contains a liquid component and a cell component.

In the illustration of FIG. 1A the chambers were configured to allow passage of the peroxide from the reservoir chamber (130) to the buffer chamber (140) upon production of the oxygen and to allow reverse passage of the peroxide (110) from the buffer chamber (140) to the reservoir chamber (130) once the oxygen production stops upon detachment of the peroxide (110) from the pin (120). In particular, the configuration of FIG. 1A allows reverse passage of the peroxide (110) from the buffer chamber (140) to the reservoir chamber (130) and occurs when a certain level of oxygen is present in the reservoir chamber (130) thus resulting in a continuous flow of oxygen from the reservoir chamber (130) to the sample loading chamber (150).

Figure 1B:
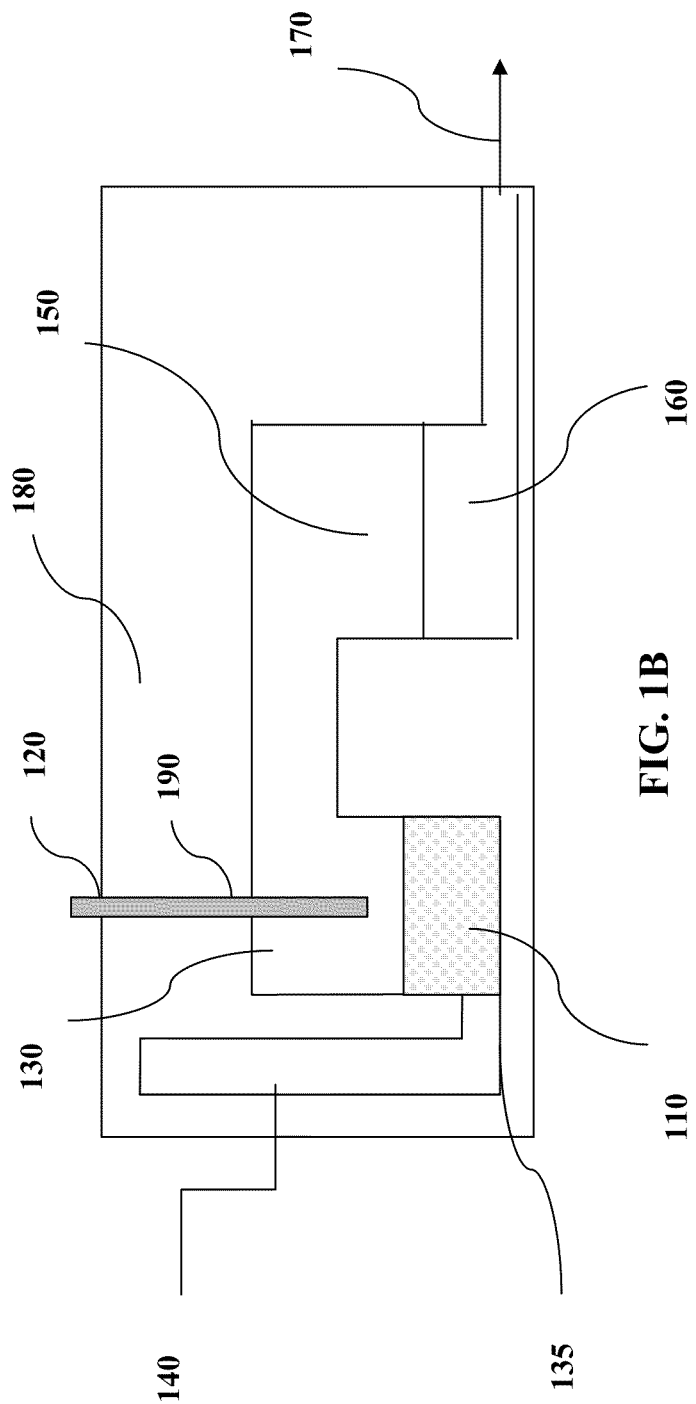

In an alternative configuration illustrated in FIG. 1B, given a same amount of oxygen generated by the decomposition of peroxide (110) and therefore a pressure applied to peroxide (110) comparable to the pressure generated in the power source of FIG. 1A, the reverse passage of the peroxide (110) from the buffer chamber (140) to the reservoir chamber (130) is allowed only when a certain portion of the oxygen, which can comprise up to all the oxygen produced by the decomposition of the peroxide (110) has been transferred to the sample loading chamber.

As a consequence, while in the configuration of FIG. 1A passage of the oxygen produced by the decomposition of the peroxide (110) is provided continuously to the sample loading chamber (150), in the configuration of FIG. 1B, passage of the oxygen to sample loading chamber is performed discontinuously in view of the gap in oxygen production, consequent to the delayed reverse passage of the peroxide (110) from the buffer chamber (140) to the reservoir chamber (130).

Control of the passage of the peroxide from the reservoir to the sample loading chamber and the corresponding actuation of the microfluidic device can be performed by chemically controlling the production of the reaction product and/or by adjusting the configuration of the sample loading chamber, the reservoir chamber and the buffer chamber to allow fluidic connection and related actuation of the microfluidic device according to a desired experimental design.

For example, in some embodiments, where generation of a certain power and a predetermined chemical reaction between a predetermined at least one reagent and a predetermined pin are desired, other parameters such as the volume of the chambers, the relevant fluidic connection, the amount and volume of the at least one reagent and the surface of the pin in the power source can be adjusted so that the reaction between the at least one reagent and the pin provides the desired power following performance of the predetermined chemical reaction.

In other embodiments, where a certain volume of the chambers and fluidic connection of the chambers are desired in connection with generation of a predetermined power, the chemical reaction, the chemical nature, amount and volume of the at least one reagent, the chemical nature, amount and surface of the pin can be adjusted so that production of a corresponding reaction product results in the generation of the predetermined power In the embodiments of FIG. 1A and FIG. 1B, the chemical reaction is a peroxide decomposition catalyzed by a Pt/Ag pin, wherein the reaction product is $O_2$.

In those embodiments, the Pt/Ag pin can be replaced by a metallic rod with diameter in the range of 0.1 mm to 3 mm and length from 5 mm to 30 mm and made of any hard metal core coated with a 10 to 100 nm thick film of Pt or Ag.

In those embodiments, hydrogen peroxide concentration can be used in a range of about 1% to about 30% and in particular of about 5% to about 10%, and more particularly 6%. Hydrogen peroxide concentrations higher than 30%, can be used in applications when the desired amount of oxygen produced and related power generated is particularly high.

Additional reactions that result in a gas product by contacting a first reagent/catalyst in the pin with a second reagent/catalyst in the reservoir chamber are also suitable for the power source herein described.

For example in one embodiment the reaction product $H_2$ and $O_2$ can be produced by dissociation of water catalyzed by titania ($TiO_2$), in presence of light to produce hydrogen and oxygen according to the equation $$2H_2O_{(l)} \rightarrow 2H_{2(g)} + O_{2(g)} \text{ with } TiO_2 \text{ and light}$$

In another exemplary embodiment, the reaction product $H_2$ can be produced by a reaction of a metal (Me), such as zinc or iron, with an acid such as chloric acid, according to the equation $$Me_{(s)} + 2HCl_{(aq)} \rightarrow MeCl_{2(aq)} + H_{2(g)}$$

Many additional reactions that result in production of an expansible reaction product are suitable for the power source herein described and are identifiable by a skilled person upon reading of the present disclosure.

Exemplary procedures to determine the amount of reaction product produced by the fluid in the reservoir chamber are illustrated in Example 1. It will be apparent, however, to one of ordinary skill in the art, that the embodiments may be practiced without limitation to these specific details. Additional well known methods and structures identifiable by a skilled person have not been described in detail so as not to unnecessarily obscure the embodiments. The levels and concentration of hydrogen peroxide may be varied to produce different levels of oxygen which will determine the reaction product. Additional chemical reactions suitable to operate the power source of the present disclosure are contemplated.

Also in the embodiments of FIG. 1A and FIG. 1B, the levels of peroxide in the reservoir chamber (130) and the related contact of the peroxide (110) with the pin (120) vary during operation, mainly due to an alternative configuration of the buffer chamber (140). A similar result can be obtained by selecting a configuration of the buffer chamber (140) in addition or in the alternative to one or more of the reservoir chamber (130), the sample loading chamber (150), the channel (135), the fluidic communication (170) and/or the related fluidic connection. Such selection can be made in view of a desired power to be generated by the chemical reaction performed in the reservoir chamber (130) as will be understood by a skilled person upon review of the present disclosure.

In the embodiments exemplified herein, the fluidic passage of the reaction product from the reservoir chamber (130) to the buffer chamber (140), the fluidic passage of the peroxide (110) from the reservoir chamber (130) and the sample loading chamber (150) and the fluidic passage of the sample from the sample loading chamber (150) to the reservoir chamber (130) are hindered by the specific configuration of the chambers and the channels ensuring fluidic communication between the chambers. Accordingly, in these embodiments, control of the power generated by the power source is increased by the selected movement of oxygen generated in the reservoir chamber to the sample loading chamber to actuate the device. In particular, in those embodiments, the pressure generated by the reaction is selectively conveyed to the sample channel continuously or discontinuously depending on the corresponding configuration of the chambers of the power source in function of the generated pressure.

In several embodiments, the chambers of the power source can be configured to allow continuous or discontinuous actuation of the microfluidic devices, through continuous or discontinuous flow of the reaction product from the power source to the microfluidic device. Control of the actuation can be performed by selecting a configuration of the chambers and a corresponding power to be chemically generated in the reservoir chambers.

The power source herein described can be used in connection with several microfluidic devices that require power to operate a fluid, (e.g. a sample fluid) within microfluidic channels. In the present disclosure, reference is made a microfluidics-based platform designed to separate plasma from whole blood, and then execute an assay of a multiplexed panel of plasma biomarker proteins. The related description is provided as an example to illustrate the power source configuration and the related operation in connection with a microfluidic device. A skilled person will be able to adapt the description provided in connection with blood related assays to assays to be performed with a different sample, and/or related parts.

Figure 2:
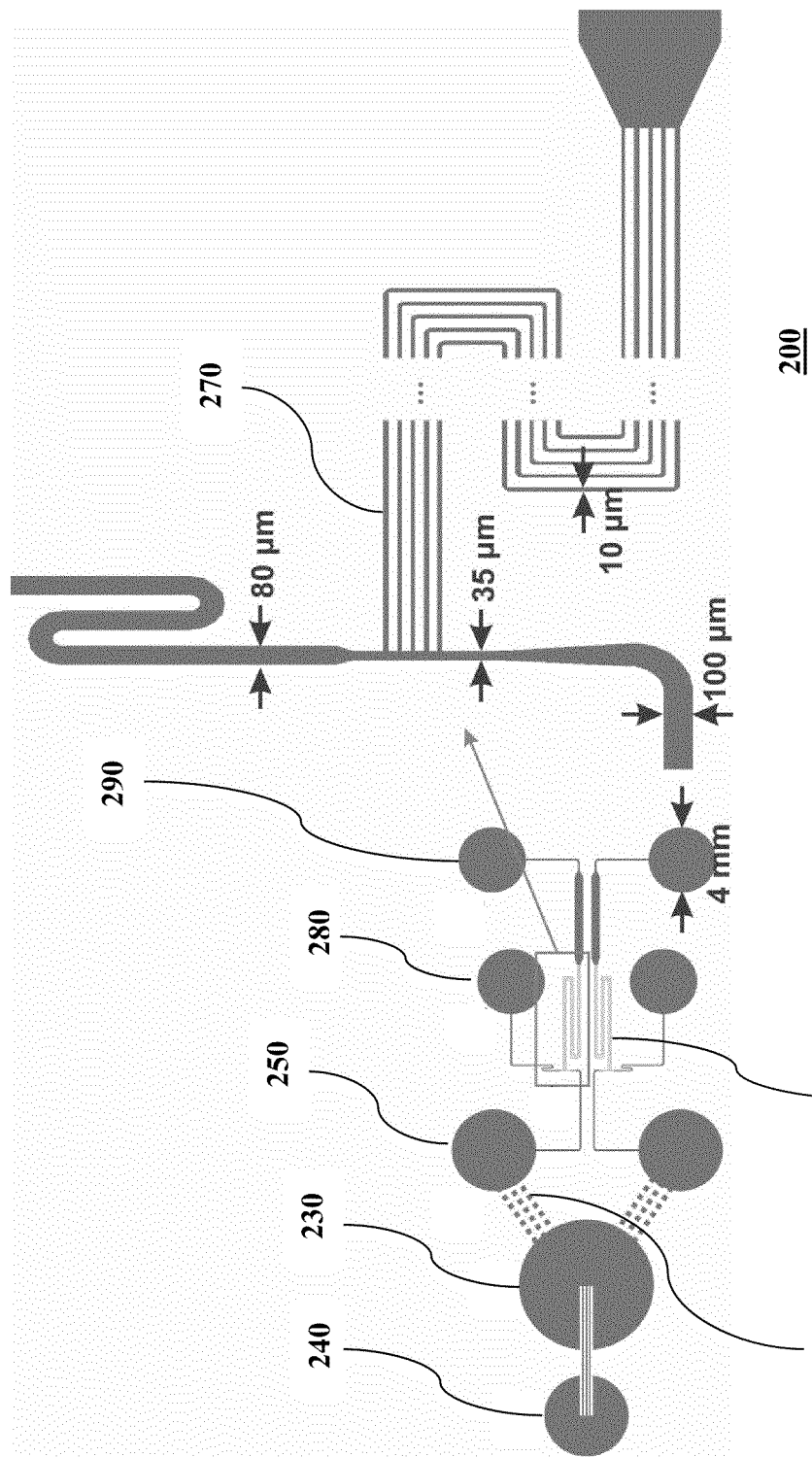
FIG. 2 shows a schematic representation of a microfluidic device.

FIG. 2 shows a composite top view with enlarged detail of a blood assay chip (200) comprising the pumping arrangement of FIG. 1. Reference numeral (240) shows a top schematic view of the buffer chamber (140) of FIG. 1. Similarly, reference numeral (230) shows a top schematic view of reservoir chamber (130) of FIG. 1. Connection between chambers (230) and (240) is obtained through channel (235), corresponding to channel (135) of FIG. 1. In the embodiment of FIG. 2, chamber (250) contains whole blood to be pumped into the downstream microfluidic circuit (260), comprising blood skimming channels (270), which are channels configured to separate plasma from an initial blood sample, as better shown in the enlarged section of FIG. 2. Also shown in the figure are a blood waste outlet (280) and a plasma outlet (290).

Figure 3:
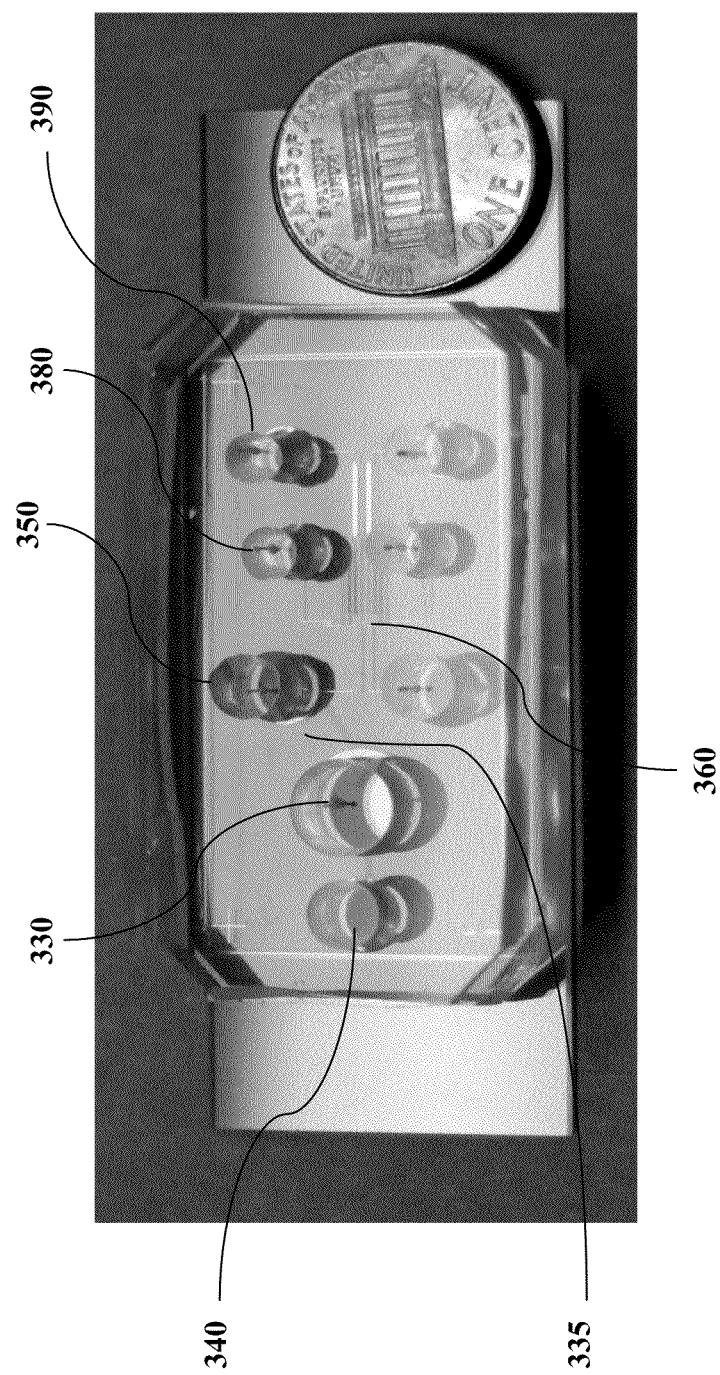
FIG. 3 shows a representation of a microfluidic device.

FIG. 3 shows an automated blood assay device comprising an on-chip power source schematically described in FIGS. 1 and 2.

Accordingly, in the automated blood assay device of FIG. 3, the source of power originates in the reservoir chamber (230) from the Pt/Ag catalyzed decomposition of diluted $H_2O_2$ to generate oxygen (FIG. 1). Depending upon the starting $H_2O_2$ concentration, the $O_2$ reaction product expands up to a 100-fold relative to the starting liquid volume. (P. A. Giguère, B. G. Morissette, A. W. Olmos and O. Knop, *Can. J. Chem.*, 1955, 33, 804-820.) $H_2O_2$ decomposition is spontaneous ($\mu G° = -119.2$ kJ mol$^{-1}$), but commercially available $H_2O_2$ has stabilizing agents, and is stable until exposed to a catalyst trigger. A Pt catalyst promotes the first order decomposition of $H_2O_2$, with a rate that is apparently limited by the diffusion of $H_2O_2$ to the catalyst surface. As shown in FIG. 3, the designed microfluidic device contains a hydrogen peroxide reservoir (330) corresponding to the chamber (230) of FIG. 2 and chamber (130) of FIG. 1, which connects to the functional region of the microfluidics-based assay via a bridging channel (335) corresponding to channel (235) of FIG. 2 and chamber (135) of FIG. 1. The bridge (335) traverses the top side of the device, and thus avoiding contact between the $H_2O_2$ reservoir (330) and the sample chamber (350). The top of the device is covered with a ~2 mm thick PDMS lid (380), and a pinhole (390) is fabricated into this lid for inserting Pt/Ag catalytic pin plugs to trigger the device (see corresponding pin hole (190) for pin (120) of FIG. 1).

In the device of FIG. 3, the pressure, generated by the chemical reaction, if not mediated, can be sufficient to de-laminate the entire device. To avoid this problem, an empty buffer chamber (340) is connected to peroxide reservoir (330) through a bottom channel. When the reaction is triggered, the generated pressure pushes the peroxide solution into the buffer chamber. The result is that the peroxide fuel level is lowered below that of the Pt/Ag catalyst pin, thus stopping $O_2$ generation, and preventing over pressurization of the device. The pressure inside the peroxide chamber then decreases as the gas drives fluid through the microfluidic channels. This raises the level of the peroxide solution in the reaction chamber so that it re-contacts the Pt/Ag pin. Balancing these two effects so as to generate a reliable and smoothly operating power source for the assay is accomplished by controlling the amount of peroxide solution, the peroxide concentration, and the pin/plug size. Although PDMS is gas-permeable gas transport through the PDMS does not compete with the rate of $O_2$ generation.

The specific self-powered, self-contained microfluidics-based device of FIG. 3 is designed to separate plasma from whole blood, and then execute an assay of a multiplexed panel of plasma biomarker proteins. Several blood based assays are performable using this self-powered device, such as the assays described in (N. L. Anderson and N. G. Anderson, Molecular & Cellular Proteomics, 2002, 1, 845, 867. L. A. Liotta, M. Ferrari and E. Petricoin, *Nature*, 2003, 425, 905. R. Fan, O. Vermesh, A. Srivastava, B. K. H. Yen, L. Qin, H. Ahmad, G. A. Kwong, C.-C. Liu, J. Gould, L. Hood and J. R. Heath, Nat Biotech, 2008, 26, 1373-1378. Proteins may be analyzed by mass spectrometry quantitation techniques, including laser-desorption (e.g., MALDI) ion source coupled to a triple-quadrupole mass analyzer. Proteins may be analyzed via the protein sandwich assay, or the enzyme-linked immunosorbent assay (ELISA), (E. Engvall and P. Perlmann, *Immunochemistry*, 1971, 8, 871-874) is widely used for measuring protein biomarker levels, among other methods (T. G. Henares, F. Mizutani and H. Hisamoto, *Analytica Chimica Acta*, 2008, 611, 17-30. J. H. Cho, S. M. Han, E. H. Paek, I. H. Cho and S. H. Paek, *Anal. Chem.*, 2006, 78, 793-800).

In other embodiments, the channel configuration of the microfluidic device can be modified to enable other assays on blood or other fluid samples and/or on fluids than samples. The power needed to actuate the specific channel configuration of the microfluidic device of choice can be provided with an appropriate power source configured in connection with the specific reagents used for the generation of the expansible reaction product.

In some embodiments, the power source is refillable with a same or another reagent. In particular, in some of these embodiments, a same or different power can be provided in view of a specific power source configuration by controlling the kind and amount of a reagent included in the reservoir chamber and corresponding production of reaction product.

In some embodiments, a replaceable power source can be provided in connection with a in a self-contained microfluidic device. In those embodiments the power source can be replaced upon exhaustion of the reagent in the reservoir chamber.

In some embodiments, the power source, one or more reagents in a same or different amounts, one or more pins of a same or different sized and/or a microfluidic device adapted to host the power source can be provided in a system which can take the form of a kit of parts.

EXAMPLES

The power sources, devices methods and systems herein described are further illustrated in the following examples, which are provided by way of illustration and are not intended to be limiting.

The following examples illustrate an on-chip microfluidic device power source, directed to driving a microfluidics-based platform designed to separate plasma from whole blood, and then execute an assay of a multiplexed panel of plasma proteins. The power source is based upon a chemical reaction that is catalytically triggered by the push of a button on a self-powered and self-contained microdevice.

A corresponding (externally powered) Integrated Blood Barcode Chip (IBBC) that was designed for the on-chip separation of plasma from whole blood, followed by a multiplexed assay of blood protein biomarkers was previously developed by Applicants (US Pat. Pub. 20090053732) (see also R. Fan, O. Vermesh, A. Srivastava, B. K. H. Yen, L. Qin, H. Ahmad, G. A. Kwong, C.-C. Liu, J. Gould, L. Hood and J. R. Heath, *Nat Biotech*, 2008, 26, 1373-1378). The assay was completed rapidly. The time from blood sample (obtained by finger-prick) to the completion of the critical steps in those assays was less than 10 minutes. (S. Yang, A. Undar and J. D. Zahn, *Lab on a Chip*, 2006, 6, 871-880). Plasma was separated from whole blood into plasma skimming channels using the Zweifach-Fung effect. (K. Svanes and B. W. Zweifach, *Microvascular Research*, 1968, 1, 210-220. Y. C. Fung, *Microvasc. Res.*, 1973, 5, 34-38). The glass bottom surfaces of the plasma skimming channels are pre-patterned with ssDNA barcodes. These barcodes are converted into antibody barcodes using the DNA-encoded antibody libraries (DEAL) (see U.S. Pat Pub. 20090036324). (R. C. Bailey, G. A. Kwong, C. G. Radu, O. N. Witte and J. R. Heath, *Journal of the American Chemical Society*, 2007, 129, 1959-1967).

Plasma protein biomarkers are captured onto individual barcode strips using specific antibody-antigen binding; each stripe within a barcode represents an assay for one protein; a complete barcode represents a full assay for a panel of, in this case, twelve protein biomarkers. The sandwich assay is completed by flowing biotinylated antibodies, followed by fluorescently-labelled streptavidin.

Example 1

The Power Source Controls Pressure Generated in the Reservoir Chamber

The device illustrated in FIG. 3 was operated to generate pressure in the reservoir chamber. The chamber pressure generated inside the peroxide device was measured by micro piezoelectric pressure transducer.

In the device of FIG. 3, the pressure was controlled by the $H_2O_2$ concentration in the automated IBBC fuel reservoir, and modulated by the protective chamber. The chamber acts to protect the device from the increased pressure from the reaction products. In the device of FIG. 3, the pressure generated inside the buffer chamber was monitored using a piezoelectric micro pressure transducer (Endevco 8507C-15), which monitors pressure changes with an accuracy of about 0.01 KPa. In this example, the Pt pin size was 0.64 mm in diameter, although other pin sizes may be used. For example pin sizes can be in the range of 0.10-1.1, 0.2-0.90, 0.5 0 0.8 mm In one embodiment, the pin size used was in the range of 0.6-0.7 mm. Pressure versus time plots were generated.

Figure 4:
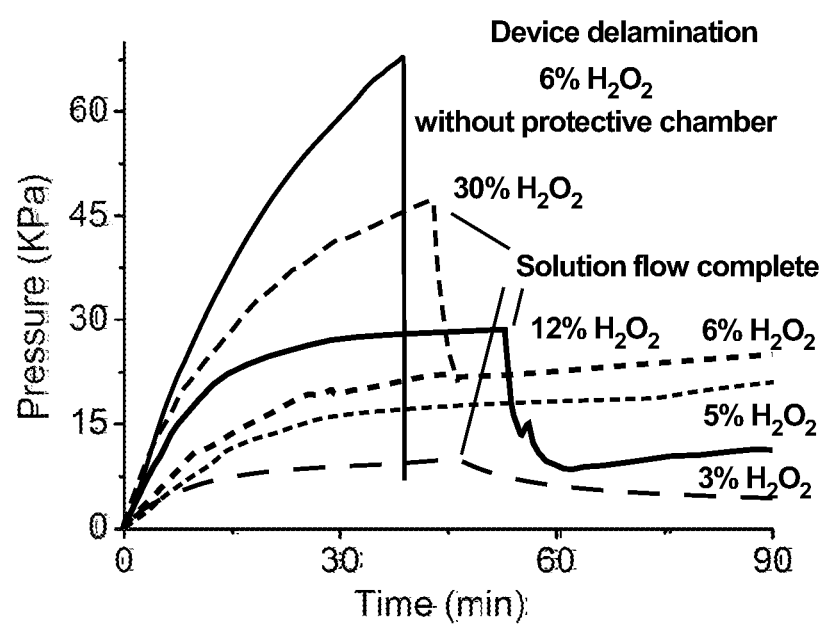
FIG. 4 shows a diagram illustrating chamber pressure measured by micro piezoelectric pressure transducer within the microfluidic device.

The results illustrated in FIG. 4 show that for a 6% peroxide solution, the pressure raises to 3 KPa within one minute of operation, stabilized at 15 kPa which permitted more than five hours of continuous operation. (FIG. 4, black curve). The optimized pressure and pin size, as well as the design of the protective chamber, permitted the automated separation of plasma from whole blood, and the subsequent, rapid assay of blood proteins.

Example 2

Manufacture of a Self-powered Microfluidic Device

Exemplary self-powered IBBC devices according to the present disclosure were fabricated using standard microfluidics device protocols. The photomask pattern of the designed flow layer (FIG. 2) was first translated into a positive structure on a silicon wafer using SPR-220-7 photoresist.

Figure 9:
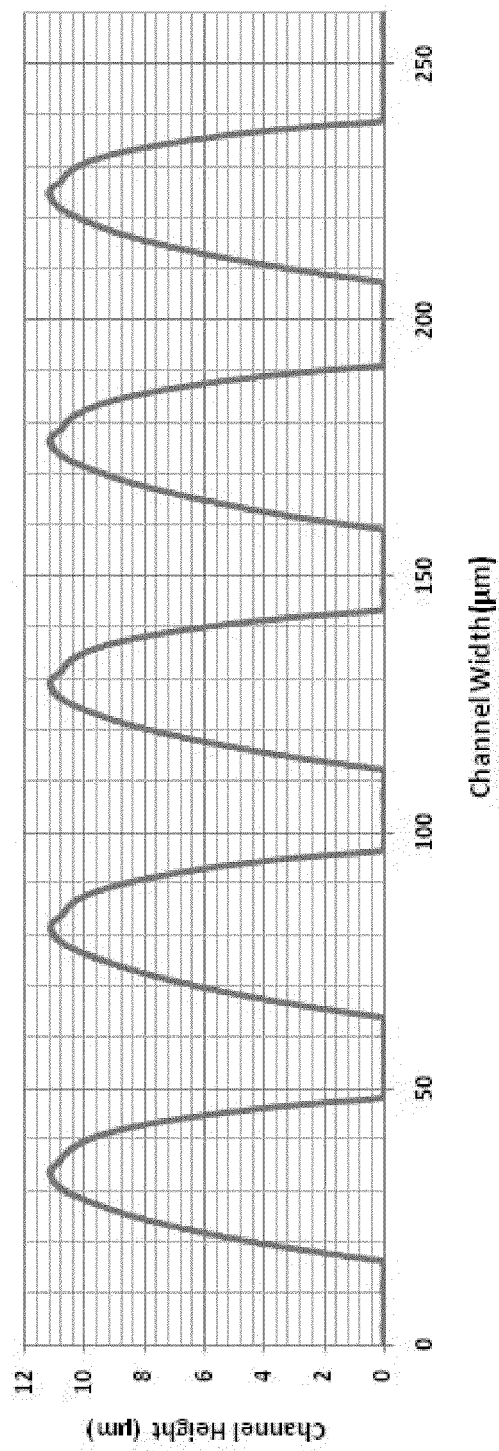
FIG. 9 shows a height profile of a plasma skimming channel of a mold for an exemplary self powered microfluidic device.

The structure was then used as a mould to form an ~8 mm 10:1 PDMS (10:1 GE RTV 615 A & B) flow layer of the microfluidics chip. The flow layer channel thickness was kept at ~11 μm. on average as shown in the topography image of FIG. 9 which illustrated the dimensions of the plasma skimming channel in the exemplary device used for the experiments herein illustrated. Channels were rounded on purpose to favor the blood separation (FIG. 9).

The control layer channel thickness was kept instead at ~20 μm. The PDMS mould was punched with holes (circles of FIG. 2) and bonded to glass slides that were pre-patterned with ssDNA bar codes. (R. Fan, O. Vermesh, A. Srivastava, B. K. H. Yen, L. Qin, H. Ahmad, G. A. Kwong, C.-C. Liu, J. Gould, L. Hood and J. R. Heath, *Nat Biotech*, 2008, 26, 1373-1378)

Figure 8:
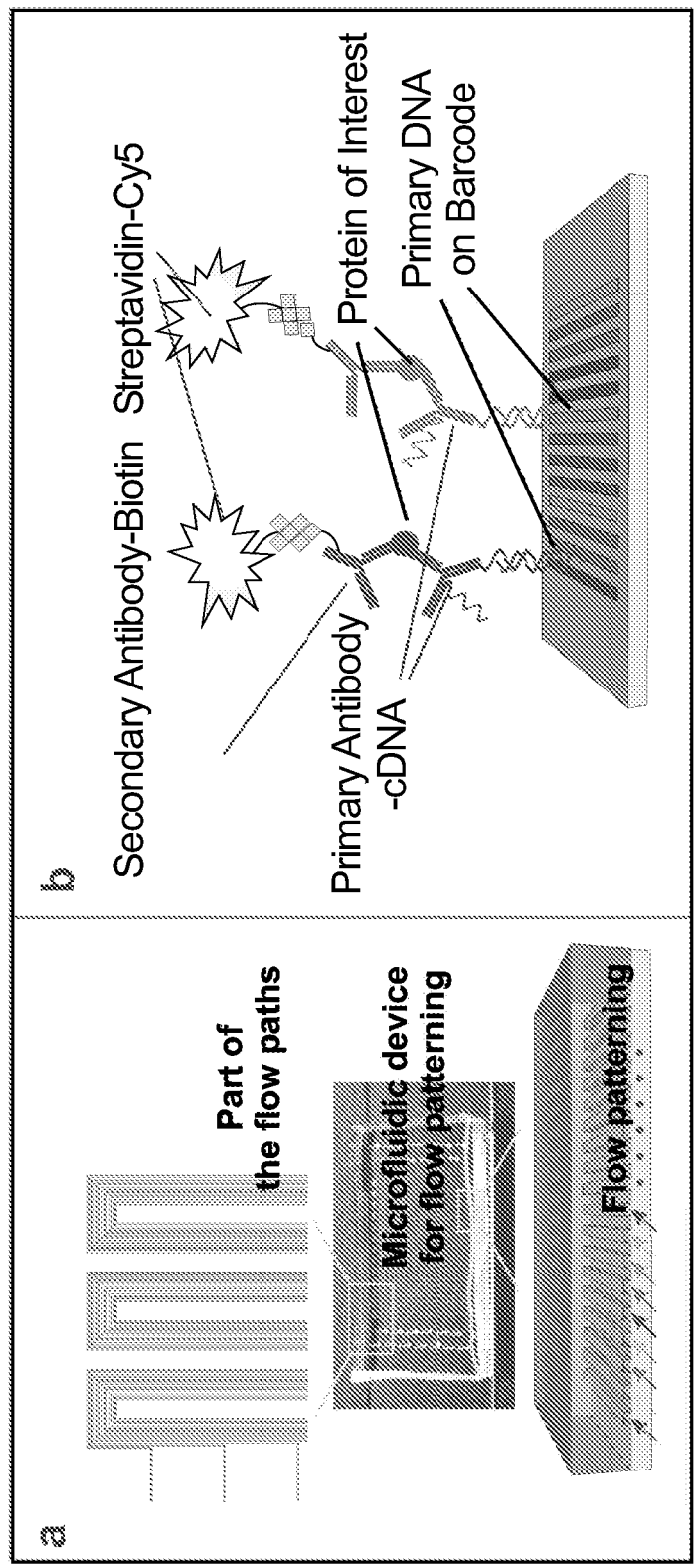
FIG. 8A is a schematic representation of an exemplary flow path and microfluidic device that can be operated in connection with a power source in a self-powered microfluidic device.
FIG. 8B is a schematic representation of an exemplary assay that can be performed in a self-powered microfluidic device.

In particular, the barcode readout scheme that was utilized for the pre-patterning is similar to the one described R. Fan, O. Vermesh, A. Srivastava, B. K. H. Yen, L. Qin, H. Ahmad, G. A. Kwong, C.-C. Liu, J. Gould, L. Hood and J. R. Heath, *Nat Biotech*, 2008, 26, 1373-1378 and US-2009-0036324 each incorporated herein by reference in its entirety. The readout scheme is shown in FIG. 8.

A set of ssDNA oligomers were first patterned onto polylysine glass slides using the technique of microfluidics-guided flow-through patterning (FIG. 8A). (R. Fan, O. Vermesh, A. Srivastava, B. K. H. Yen, L. Qin, H. Ahmad, G. A. Kwong, C.-C. Liu, J. Gould, L. Hood and J. R. Heath, *Nat Biotech*, 2008, 26, 1373-1378.) This formed the barcode, with each barcode stripe containing a unique ssDNA oligomer.

The automated IBBC chip was then assembled. The top PDMS layer, which contained the bridge connections between the peroxide reservoir and sample injection chamber, was aligned with and bonded to the flow layer to form the final device (FIG. 3). The micro-pump, sample injection, plasma skimming component, and protein assay region were all integrated into a compact package (FIG. 3). The resulting chip was then ready for priming.

In general, a chip manufactured as herein exemplified can be primed for an assay, and then stored at 4° C. for a week, prior to use or be stored without performing the priming. For the priming step, the ssDNA barcodes can be first converted into antibody barcodes using ssDNA'-labelled primary antibodies using the approach schematically illustrated in FIG. 8B.

According to this approach, primary (1°) antibodies conjugated with complementary ssDNA' oligomers (FIG. 8B) were flowed through the plasma skimming channels, and this converted the ssDNA barcodes into antibody barcodes via DNA hybridization. In the assay step, the protein biomarkers from the plasma samples, if present, did bind to the antibody barcodes. In the readout step, all relevant biotinylated 2° antibodies were flowed through the plasma channels, and then streptavidin-Cy5 fluorescent labels were added to develop the assay (FIG. 8B).

To manufacture the device used in the following examples, 50 μL 1% BSA/PBS solution was added to each sample injection chamber using a regular syringe and the solution was slightly pushed through the microfluidic region. Mixed primary antibodies, which were conjugated with ssDNA' oligomers that were complimentary to the ones on the glass substrates (FIG. 8B), were then applied to the device and washed away. The fuel reservoir was then filled with 0.1 ml 6% $H_2O_2$ and a Pt pin was installed on the top pin hole, but out of contact with the $H_2O_2$ fuel. Chips are stable when stored.

The reagents used for patterning and priming the chip of this example are listed in Table 1.

TABLE 1

Exemplary reagents used for the protein biomarker barcodes.

| Bar code # | Protein | First ssDNA oligomers | SEQ ID NO | Second ssDNA' oligomers complementary to first SSDNA oligomers | SEQ ID NO |
|---|---|---|---|---|---|
| 1 | Complement component 3 (C3) | 5'-AAA AAA AAA AGA GTA GCC TTC CCG AGC ATT-3' | 1 | 5' NH3-AAA AAA AAA AAA TGC TCG GGA AGG CTA CTC-3' | 2 |
| 2 | Fibrinogen | 5'-AAA AAA AAA ATA TGG GTC TTG CTG ATA CGC | 3 | 5' NH3-AAA AAA AAA AGC GTA TCA GCA AGA CCC ATA-3 | 4 |
| 3 | C-reactive protein (CRP) | 5'-AAA AAA AAA AGC GTG TGT GGA CTC TCT CTA-3' | 5 | 5' NH3-AAA AAA AAA ATA GAG AGA GTC CAC ACA CGC-3' | 6 |
| 4 | Plasminogen | 5'-AAA AAA AAA ATC GCC GTT GGT CTG TAT GCA-3' | 7 | 5' NH3-AAA AAA AAA ATG CAT ACA GAC CAA CGG CGA-3' | 8 |
| 5 | Interleukin (IL)12 | 5'-AAA AAA AAA AGG CGG CTA TTG ACG AAC TCT-3' | 9 | 5' NH3-AAA AAA AAA AAG AGT TCG TCA ATA GCC GCC-3' | 10 |
| 6 | IL17A | 5'-AAA AAA AAA AAA TGA GCG CGA ACA CCT GAC-3' | 11 | 5' NH3-AAA AAA AAA AAA TGA GCG CGA ACA CCT GAC-3' | 12 |
| 7 | Tumor necrosis factor-alpha (TNFα) | 5'-AAA AAA AAA ATC TTC TAG TTG TCG AGC AGG-3' | 13 | 5' NH3-AAA AAA AAA ACC TGC TCG ACA ACT AGA AGA-3' | 14 |
| 8 | IL13 | 5'-AAA AAA AAA AGC GTG TGT GGA CTC TCT CTA-3' | 15 | 5' NH3-AAA AAA AAA ATA GAG AGA GTC CAC ACA CGC-3' | 16 |
| 9 | IL8 | 5'-AAA AAA AAA ACT CTG TGA ACT GTC ATC GGT-3' | 17 | 5' NH3-AAA AAA AAA AAC CGA TGA CAG TTC ACA GAG-3' | 18 |
| 10 | IL2 | 5'-AAA AAA AAA AGT CCT CGC TTC GTC TAT GAG-3' | 19 | 5' NH3-AAA AAA AAA ACT CAT AGA CGA AGC GAG GAC-3' | 20 |

TABLE 1-continued

Exemplary reagents used for the protein biomarker barcodes.

| Bar code # | Protein | First ssDNA oligomers | SEQ ID NO | Second ssDNA' oligomers complementary to first SSDNA oligomers | SEQ ID NO |
|---|---|---|---|---|---|
| 11 | Control | 5'-AAA AAA AAA AGT CGA GGA TTC TGA ACC TGT-3' | 21 | | |
| 12 | IL10 | 5'-AAA AAA AAA ATA ATC TAA TTC TGG TCG CGG-3' | 22 | 5' NH3-AAA AAA AAA ACC GCG ACC AGA ATT AGA TTA-3' | 23 |
| 13 | IL6 | 5'-AAA AAA AAA ATG CCC TAT TGT TGC GTC GGA-3' | 24 | 5' NH3-AAA AAA AAA ATC CGA CGC AAC AAT AGG GCA-3' | 25 |

The resulting microfluidic device was designed for two separate assays—one starting with fresh blood, the other with fresh, spiked blood to serve as a control and was operated according to the procedures exemplified in Examples 3 to 5.

Example 3

Operation of a Self-powered Microfluidic Device

A device manufactured with procedures exemplified in Example 2, was operated to perform various assays.

In a typical assay, a fingerprick of human blood (approximately 2 µL) was collected and added, via syringe, to the sample reservoir, where it was mixed by diffusion with 20 µL preloaded EDTA/BSA/PBS. Procedures were conducted according protocols approved by the Caltech institutional review board. Two (non-catalytic) pins were used to block the blood inlet.

The assay was triggered by pushing the Pt pin into contact with the peroxide reservoir. Pressure builds up inside the device within a few seconds and drives the blood through the blood-skimming channel (data not shown). Plasma (>99% cell-free) was skimmed into the assay channels (FIG. 2). After a set time of operation, flow was stopped by raising the Pt pin. The protein data is written onto the barcodes. In principle, the development of the assay (with fluorescently-labelled secondary antibodies) may be similarly automated as well. However, for this example, the PDMS layers were simply peeled away from the glass slide, and the development and barcode reading steps were then done on the glass slide. The development step includes the addition of a single solution containing the biotinylated secondary antibodies and streptavidin-Cy5. The developed barcode assays were read using a standard gene chip scanner (Axon Genepix 4000B), and the detected proteins appear as fluorescent bars within the barcodes (see Examples 4 and 5). Fully developed barcode assays may be stored for many days without affecting the readout.

Example 4

Quantitative Detection of a Target Performed with a Self-powered Microfluidic Device An off-chip powered IBBC including a microfluidic channel arrangement illustrated in FIG. 8A, was previously utilized for the quantitative detection of proteins in human plasma as described in US Patent published applications US-2009-0036324 and US-2009-0053732 incorporated herein by reference in their entirety.

Detection limits were measured for these automated IBBCs, from whole human blood, and for the representative protein: Interleukin-12 (IL-12).

Blood was spiked with IL-12 in Eppendorf tubes, at various concentrations, into fresh blood from a healthy human donor, and that blood was then assayed for IL-12 using an automated IBBC, manufactured and operated as described in Examples 2 and 3.

In particular, finger pricks were carried out using BD Microtainer Contact-Activated Lancets (purple lancet—for low volume, single blood drop). Blood was collected with SAFE-T-FILL capillary blood collection tubes (RAM Scientific), which we pre-filled with a 25 mM EDTA solution as discussed below. Two samples were prepared from the drop of whole blood.

(i) Unspiked Blood Samples: The blood collection tube was pre-filled with 80 µL of 25 mM EDTA solution, and then 10 µL of fresh human blood was collected in the EDTA-coated capillary, dispensed into the tube and rapidly mixed by inverting a few times.

(ii) Spiked Blood Samples: The blood collection tube was pre-filled with 40 µL of 25 mM EDTA solution. Forty microliters of recombinant protein solution, containing all the protein standards, was added. Then, 2 uL of 0.5 M EDTA was added to bring the total EDTA concentration up to 25 mM. Finally, 10 µL of fresh human blood was collected in an EDTA-coated capillary, added to the tube and quickly mixed by inverting a few times. The final concentrations for all protein standards were on the order of 10 nM. However, the quality of these "standards" and the affinity of capture antibodies vary substantially. The purpose of spiking in protein standards was only to contrast the signal at high protein concentrations with that of as-collected fresh whole blood.

Prior to use, all microfluidic channels in the microfluidic device were blocked with the assay buffer solution (1% w/v BSA/PBS solution prepared by adding 98% pure Bovine Serum Albumin, Fraction V (Sigma) to 150 mM 1×PBS without calcium/magnesium salts (Irvine Scientific)) for 30-60 minutes.

A solution containing all DNA-antibody conjugates was flowed through the assay channels of the Blood Separation/

Protein Assay (BS/PA) chips for ~30-45 min, and thus transformed the DNA barcode microarray into an antibody microarray, enabling the subsequent surface-bound immunoassay. The unbound conjugates were removed by flowing the assay buffer solution for 10 minutes. The DEAL-conjugate solution was prepared by mixing all synthesized conjugates in 1% BSA/PBS with a final concentration of 5 µg/mL. The DNA coding oligomers were pre-tested for orthogonality to ensure that cross-hybridization between non-complementary oligomer strands yielded a fluorescence intensity that did not exceed 5% of the complementary-pair signal intensity.

The blood samples were flowed into the BS/PA chips within 1 minute of collection. The plasma was quickly separated from blood cells within the chip, and the proteins of interest were captured in the downstream assay zone containing the DEAL barcode arrays. The entire process from finger prick to the completion of plasma protein capture was very rapid (<10 mins), even though all steps were done by hand. Automated processes could expedite the entire process to <5 minutes. The short time scale for the assay is largely attributable to the reduced diffusion barrier in a flowing microfluidic environment. Conventional immunoassays take 1-2 hours or more—and they first require that the blood cells are separated by centrifugation.

A mixture of biotin-labeled detection antibodies was flowed into the microfluidic devices for ~30 min to complete the DEAL assay. The detection-antibody solution contained biotinylated detection antibodies at ~5 µM prepared in 1% BSA/PBS. Afterwards, unbound detection antibodies in the BS/PA chips were removed by flowing the assay buffer for 10 minutes.

Cy5 fluorescent dye-labeled streptavidin and the reference, Cy3-labeled complementary ssDNA (DNA code M/M'), were mixed together and were then flowed into the BS/PA chips for 30 min. Finally, the assay buffer was flowed for 10 minutes to remove unbound Steptavidin-Cy5.

The PDMS blood chip device was removed from the DNA-patterned glass slide. The slide was immediately dipped 6 times each in the following solutions in order: 1% BSA/PBS solution, 1×PBS solution, ½×PBS solution, deionized Millipore $H_2O$. The slide was rinsed for a few seconds under a Millipore $H_2O$ stream, and then dried with a nitrogen gun.

The slide was scanned by an Axon Instruments Genepix Scanner. The finest resolution (5 µm) was selected. Two color channels (the green Cy3 channel and the red Cy5 channel) were turned on to collect fluorescence signals.

For each concentration, the stripes from 10 separate barcodes that corresponded to the IL-12 readout location were imaged, digitized, and averaged by ImageJ (see www page rsbweb.nih.gov/ij).

Figure 5:
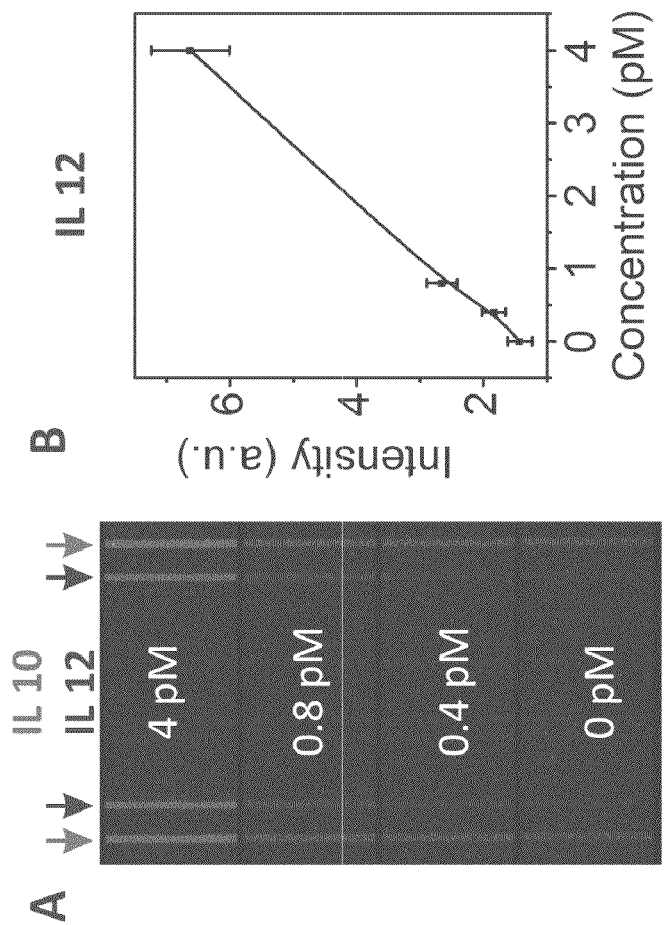
FIG. 5 shows IL-12 measurement performed from spiked whole blood using a self-powered microfluidic device.

The results, illustrated in FIG. 5, showed that IL-12 exhibited a consistent trend of intensity vs. concentration with a detection limit of approximately 0.4 PM. This compares with the vendor quoted ELISA detection sensitivity of 15 pg/ml (0.3 PM) (eBioscience™). This data indicates that the automated IBBC can assay for blood proteins within a clinically relevant concentration range (L. Romani, P. Puccetti and F. Bistoni, Clin. Microbiol. Rev., 1997, 10, 611-636).

Example 6

Multiplexed Target Detection Performed with a Self-powered Microfluidic Device

As a demonstration of a multiplexed, rapid protein assay, blood from the same healthy volunteer was assayed using a twelve-cytokine biomarker panel.

Figure 6:
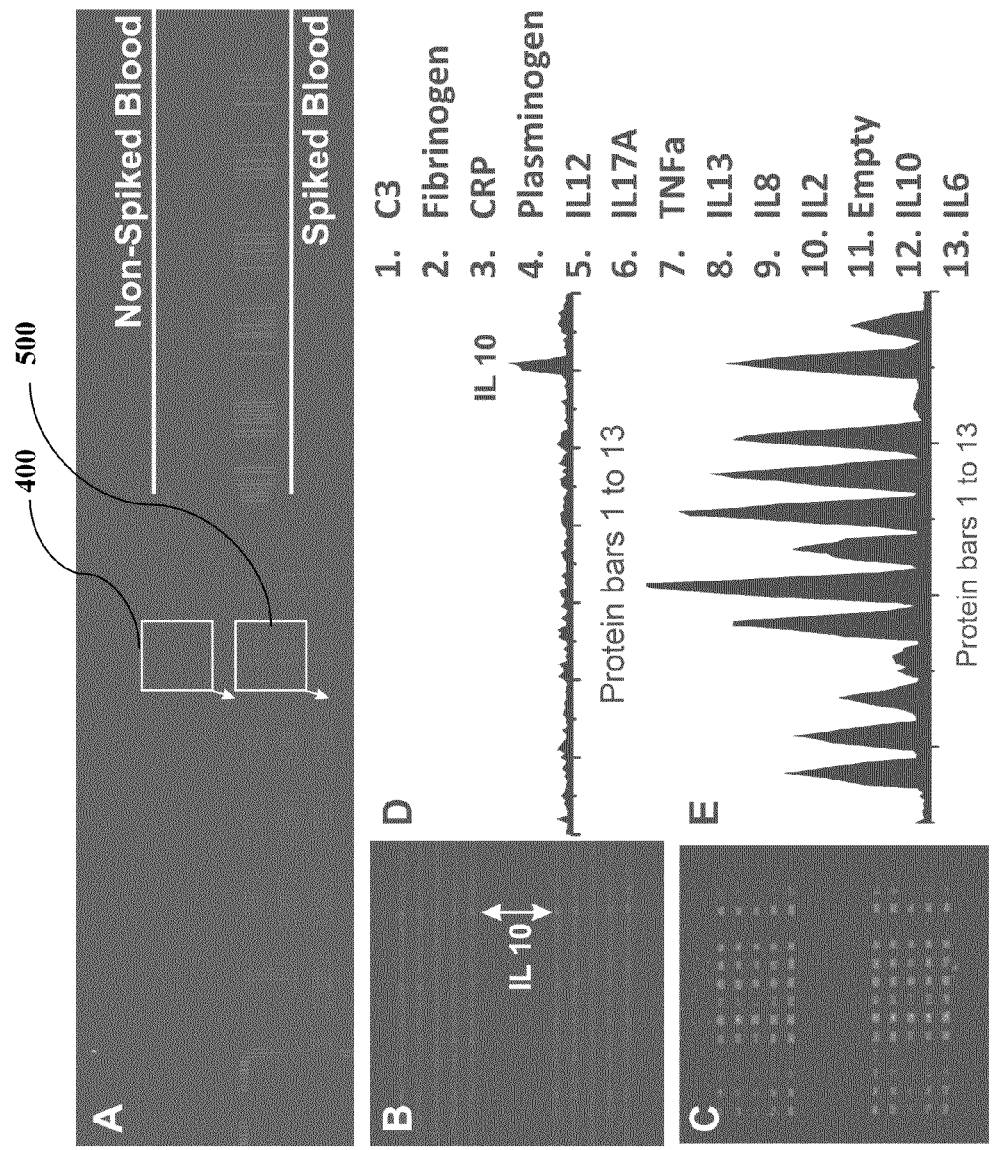
FIG. 6 shows a graph and fluorescent images of protein identification performed in human blood using a self-powered microfluidic device.

One fingerprick of blood (typically approximately 500 micrograms or less) was directly applied to the microfluidic device and the other fingerprick of blood (usually approximately 500 micrograms or less) was added to eppendorf tubes and spiked with the twelve proteins listed in FIG. 6 at a concentration of about 300 pg/ml (N. L. Anderson and N. G. Anderson, Molecular & Cellular Proteomics, 2002, 1, 845-867). One bar within each barcode was functionalized with an ssDNA oligomer that was not complementary to any ssDNA'-labeled primary (1°) antibody conjugates, and served as an alignment marker and a negative control. (B. Schweitzer, S. Roberts, B. Grimwade, W. P. Shao, M. J. Wang, Q. Fu, Q. P. Shu, I. Laroche, Z. M. Zhou, V. T. Tchernev, J. Christiansen, M. Velleca and S. F. Kingsmore, Nature Biotechnology, 2002, 20, 359-365. W. W. Lin and M. Karin, Journal of Clinical Investigation, 2007, 117, 1175-1183. M. Zimmermann, E. Delamarche, M. Wolf and P. Hunziker, Biomedical Microdevices, 2005, 7, 99-110.) Both the non-spiked and spiked blood samples were assayed simultaneously and on the same chip, and were read simultaneously.

The results are illustrated in FIG. 6, wherein the investigated 12 proteins and their corresponding barcode positions are listed on the right bottom portion of the figure. In particular, the spiked human blood sample of the analysis of FIG. 6 shows 1 12 protein bars, as well as the (blank) control (bar #11). However, for the non-spiked blood sample, only IL-10 was detected (see also FIGS. 6B and 6D) with a signal to background ratio of 3.5 (standard deviation=0.6), a result that would be expected based on previous studies (references). (J. Karcher, C. Reisser, V. Daniel and C. Herold-Mende, Hno, 1999, 47, 879-884. M. Kupczyk, I. Kupryae-Lipinska, M. Bocheuska-Marciniak, P. Gorski and P. Kuna, Allergy, 2007, 62, 248-248. M. Navarrete, A. Palacios, M. J. Cruz, A. Blanco, I. Caragol and A. Lopez, Blood, 2006, 108, 227B-227B).

Example 7

Flow Rates in a Self-powered Microfluidic Device

Assays carried out under conditions of sufficiently high plasma flow rates are limited by the kinetics of the antibody/protein binding and are therefore particularly efficient. (M. Zimmermann, E. Delamarche, M. Wolf and P. Hunziker, Biomedical Microdevices, 2005, 7, 99-110.) Accordingly the assays could be accomplished in 5 to 10 minutes from applying blood onto the chip even if a complete visualization can require about 1 to 2 hours.

Applicants explored the kinetics using the self-powered microfluidic device of an automated blood assays. Several flow rates were used in an effort to identify the minimum time required per assay.

Figure 7:
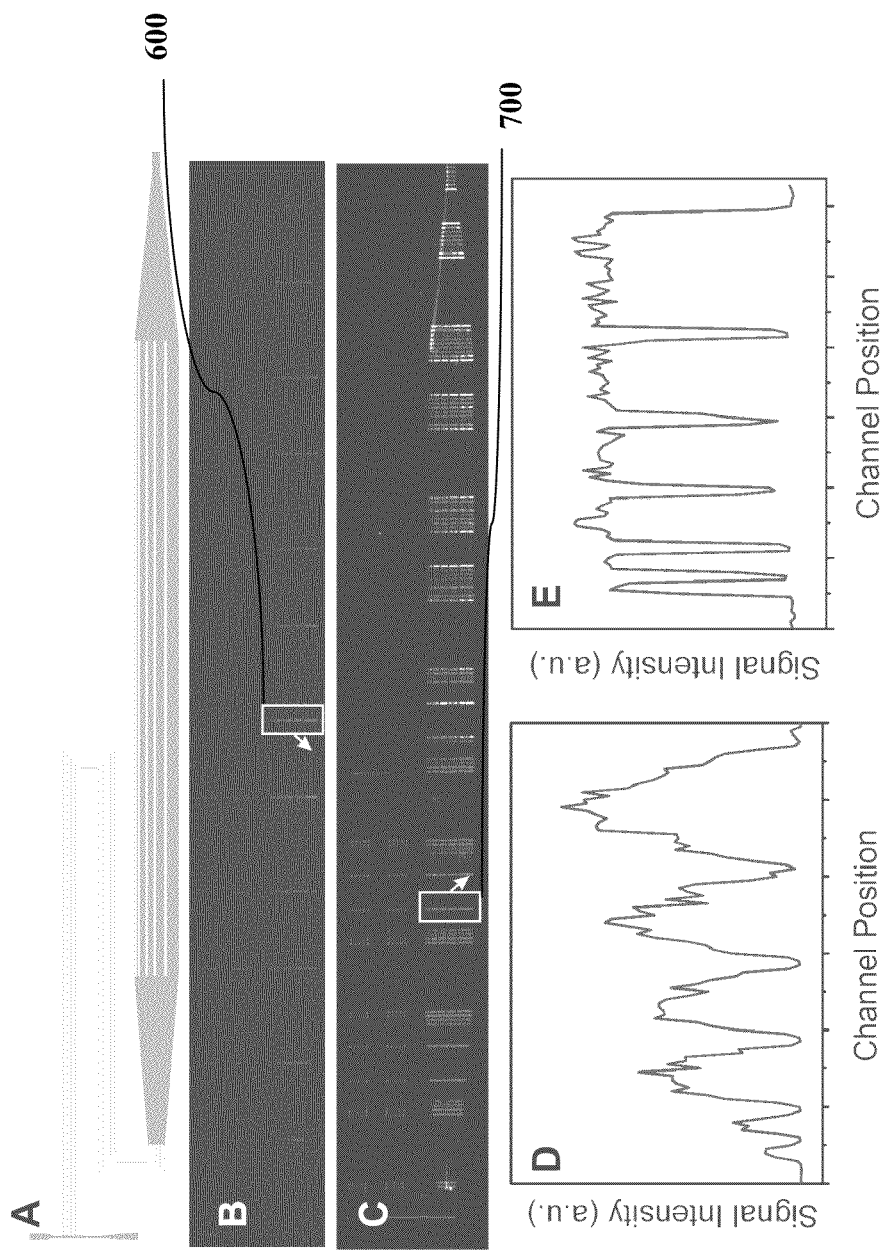
FIG. 7 shows a flow speed study of spiked human blood performed with a self-powered microfluidic device.

For this purpose, the six plasma skimming channels within a single fingerprick measurement device were designed with different channel widths (FIG. 7 top portion), and hence different flow rates within an otherwise identical assay.

Figure 10:
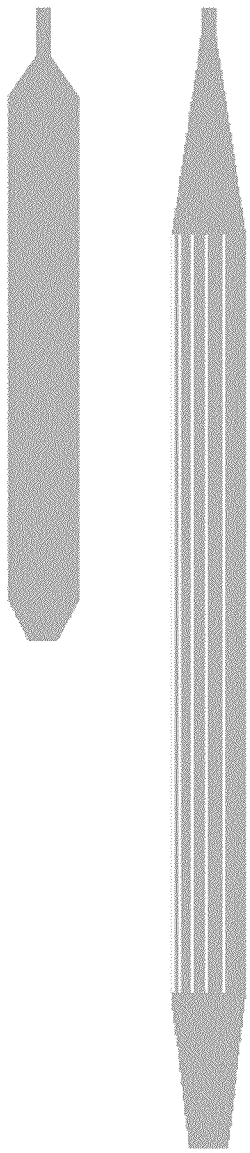
FIG. 10 shows a schematic representation of an exemplary combination of microfluidic channels that can be operated in connection with a power source in a self-powered microfluidic device.

In particular, in the measurement device with different channel widths, the sub-channels of six different widths are elongated in comparison to the original single wide plasma channel as exemplarily illustrated in the schematics of FIG. 10. This elongation is to increase the flow resistance difference between the six sub-channels. The channel height profile is also measured, which clarifies the dimension of the six sub-channels In the illustration of FIG. 10 the plasma channel length of the six sub-channels in variable flow rate experiment, is shown in comparison to the original single plasma channel of the illustration of FIG. 9 (see Example 4). The length is elongated from 5 mm to 7.5 mm.

Figure 11:
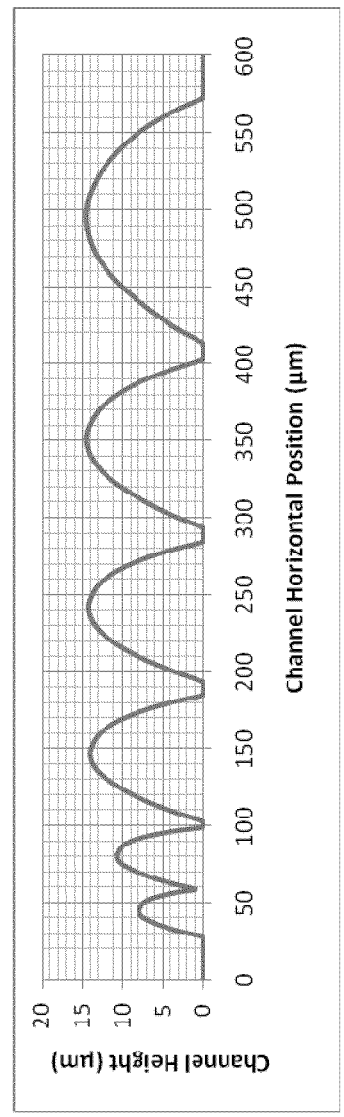
FIG. 11 shows a height profile of a plasma skimming channel of a mold for an exemplary self powered microfluidic device.

The dimensions of the sub-channels were characterized by a height profile scan, FIG. 11, which shows a height profile of plasma skimming channel of a device mold.

Besides the width variance, (approximately 1×, 2×, 6×, 8×, 10×, and 15×) from the narrowest to the broadest, there is a slight height variance resulting from the device fabrication step (which occurred during development of photoresist). The channels were also rounded during fabrication. When designing the device, Applicants used Darcy's Law to calculate the flow rate variance, which gives flow rate variance of 1×, 2×, 6×, 8×, 10×, and 15×. Actual flow rate is related to channel material, roughness, and other factors. Applicants were able to demonstrate that the channel dimensions are controlling the flow rate (data not shown).

The sub-channels were elongated to realize the flow speed differences between channels a design modification that did not change the plasma separation process. (D. J. Beebe, G. A. Mensing and G. M. Walker, *Annual Review of Biomedical Engineering,* 2002, 4, 261-286.) After a two minute flow period, protein levels recorded in the six individual channels were different: the widest (fastest-flow rate) channel exhibited higher signals levels, as would be expected. (O. Hofmann, G. Voirin, P. Niedermann and A. Manz, *Anal. Chem.,* 2002, 74, 5243-5250. V. G. Levich, *Physiochemical Hydrodynamics,* Prentice Hall, Englewood Cliffs, N.J., 1962). However, for flow times of five minutes, the measured signals in all of the skimming channels were saturated and yielded identical signal levels (FIG. 7C and FIG. 7E). The flowing of analyte in microfluidic channel has a parabolic flow profile. (M. Zimmermann, E. Delamarche, M. Wolf and P. Hunziker, *Biomedical Microdevices,* 2005, 7, 99-110.) with low flow near the channel walls and high flow in the channel center. For unsaturated assays (FIG. 7D), this variance in flow rate leads to a parabolic-shaped signal, peaked in the region of the barcode that corresponded to the center of the channel. For saturated assays, this effect is gone. This study implies that the time from fingerprick to completion of the critical assay steps can be reduced to five minutes without loss in sensitivity. The assay is reproducible and was repeated 20 times. The detection sensitivity and accuracy was limited only by the barcode patterning (M. Navarrete, A. Palacios, M. J. Cruz, A. Blanco, I. Caragol and A. Lopez, *Blood,* 2006, 108, 227B-227B.) or the tested antibodies, but not by the automation.

Approaches that optimize assays for fast measurement have been extensively discussed in reference M. Zimmermann, E. Delamarche, M. Wolf and P. Hunziker, *Biomedical Microdevices,* 2005, 7, 99-110.

The ssDNA barcodes were patterned at a high density using microchannel-guided flow patterning to measure a large panel of protein biomarkers from this small volume. We used a PDMS mold that was thermally bonded onto a polyamine-coated glass slide to pattern the entire ssDNA barcode. Polyaminated surfaces permit substantially higher DNA loading than more traditional aminated surfaces and provide for an accompanying increase in assay sensitivity. Different solutions, each containing a specific ssDNA oligomer, were flowed through different channels and evaporated through the gas-permeable PDMS stamp, resulting in individual stripes of DNA molecules. One complete set of stripes represents one barcode. All measurements used 20-μm wide bars spaced at a 40 μm pitch. This array density represents an approximately tenfold increase over a standard spotted array (typical dimensions are 150 μm diameter spots at a 400 μm pitch), thus expanding the numbers of proteins that can be measured within a small volume. No alignment between the barcode array and the plasma channels was required. In the cancer-patient serum experiment, the as-received serum samples were flowed into IBBCs without any pre-treatment (that is, no purification or dilution). Afterwards, a mixture of biotin-labeled detection antibodies for the entire protein panel and the fluorescence Cy5-streptavidin conjugates were flowed sequentially into IBBCs to complete the DEAL immunoassay. The unbound fluorescence probes were rinsed off by flowing the buffer solution for 10 min. At last, the PDMS chip was removed from the glass slide. The slide was immediately rinsed in ½ PBS solution and deionized water and then dried with a nitrogen gun. Finally, the DEAL barcode slide was scanned by a microarray scanner. All protein assays used one color fluorophore and were spatially identified using a reference marker that fluoresced at a different color.

The strategy for rapid assays is to have a high fluid flow velocity to prevent mass transport limitations and a small capturing area to increase the analyte exploitation. The flowing of analyte in microfluidic channel has a parabolic flow profile, and this can influence the results. For relatively low flow rates, the assays of FIG. 7D reflect these velocity profiles, but for saturated assays, the effect is absent. Moreover, the parabolic flow profile likely also explains the slow flow of blood cells near the channel wall.

The results of the experiments illustrated above exemplify the design of an automatic self-powered microfluidic device suitable for various assays such as rapid blood protein assays from whole blood. In the specific procedures of the examples $H_2O_2$ was used to power the device which is integrated on-device. Applicants tested twelve blood-based protein biomarkers with a simple pin activated push-button operation. This simple "platform is expected to allow at least in some embodiments, a high throughput, accurate, multiplexed blood diagnostic measurements.

The examples set forth above are provided to give those of ordinary skill in the art a complete disclosure and description of how to make and use the embodiments of the power sources, devices, systems and methods of the disclosure, and are not intended to limit the scope of what the inventors regard as their disclosure. Modifications of the above-described modes for carrying out the disclosure that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) in the Background, Summary, Detailed Description, and Examples is hereby incorporated herein by reference. Further, the hard copy of the sequence listing submitted herewith and the corresponding computer readable form are form part of the present disclosure and are both incorporated herein by reference in their entireties.

It is to be understood that the disclosures are not limited to particular compositions or biological systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Although any methods and materials similar or equivalent to those described herein can be used in the practice for testing of the products, methods and system of the present disclosure, examples of appropriate suitable materials and methods are described herein for guidance purpose.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A self-powered microfluidic device comprising:
an arrangement of microfluidic channels wherein one or more reagents are adapted to flow; and
a pressure source to pump the reagents through the microfluidic channels, the pressure source comprising:
a reservoir containing a substance adapted to generate a pressure-generating reaction product;
a trigger, associated with the reservoir, adapted to react with the substance to produce the pressure-generating reaction product;
wherein the trigger comprises a pin, and wherein the pin contains a catalyst to generate the reaction product,
a buffer chamber in fluid communication with the reservoir, adapted to host the substance upon production of the pressure-generating reaction product, wherein the fluid communication between the buffer chamber and the reservoir is a channel; and
a reagent chamber containing the one or more reagents, the chamber connected between the pressure source and the arrangement of microfluidic channels.

2. The microfluidic device of claim 1, wherein the substance is hydrogen peroxide and the pressure-generating reaction product is oxygen.

3. The microfluidic device of claim 1, wherein the arrangement of microfluidic channels is a microfluidic assay for separation of plasma from whole blood.

4. The microfluidic device of claim 1, wherein the catalyst is Pt or Ag.

5. The microfluidic device of claim 1, wherein the pin is measured in the range of 0.6-0.8 mm.

6. The microfluidic device of claim 1, further comprising a channel between the reservoir and the buffer chamber.

7. The microfluidic device of claim 1, further comprising a channel between the reservoir and the reagent chamber.

8. The microfluidic device of claim 1, further comprising a channel between the reservoir and the buffer chamber, and a channel between the reservoir and the reagent chamber.

9. The microfluidic device of claim 1, wherein the channel has a smaller diameter than the reservoir.

10. The microfluidic device of claim 1, wherein the channel connects the bottom of the reservoir with the buffer chamber.

11. The microfluidic device of claim 1, the pin is configured so that more of the pin is exposed to the reaction product when the reservoir contains more reaction product.

12. The microfluidic device of claim 1, wherein the pin extends into the reservoir from the top of the reservoir.

* * * * *

UNITED STATES PATENT AND TRADEMARK OFFICE
CERTIFICATE OF CORRECTION

| | | |
|---|---|---|
| PATENT NO. | : 8,557,199 B2 | Page 1 of 1 |
| APPLICATION NO. | : 12/629749 | |
| DATED | : October 15, 2013 | |
| INVENTOR(S) | : Heath et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this
Seventh Day of April, 2015

Michelle K. Lee
*Director of the United States Patent and Trademark Office*